(12) United States Patent
Gluszyk et al.

(10) Patent No.: US 6,246,154 B1
(45) Date of Patent: Jun. 12, 2001

(54) ULTRASONIC TRANSDUCER

(75) Inventors: Jozef J. Gluszyk, Houston; Donald W. Teale, Seabrook, both of TX (US)

(73) Assignee: Coherent Technologies, Sugar Land, TX (US)

( * ) Notice: Subject to any disclaimer, the term of this patent is extended or adjusted under 35 U.S.C. 154(b) by 0 days.

(21) Appl. No.: 09/267,466

(22) Filed: Mar. 11, 1999

Related U.S. Application Data

(63) Continuation-in-part of application No. 08/742,706, filed on Nov. 1, 1996.
(60) Provisional application No. 60/077,496, filed on Mar. 11, 1998.

(51) Int. Cl.$^7$ ................................................. H01L 41/053
(52) U.S. Cl. ............................................. 310/324; 310/334
(58) Field of Search ..................................... 310/322, 324, 310/334

(56) References Cited

U.S. PATENT DOCUMENTS

| | | | |
|---|---|---|---|
| 4,130,018 | * | 12/1978 | Adams et al. ........................ 310/336 |
| 4,417,480 | * | 11/1983 | Zacharias ............................. 310/327 |
| 4,755,975 | * | 7/1988 | Ito et al. .............................. 310/324 |
| 4,945,276 | * | 7/1990 | Mylvaganam et al. .............. 310/326 |
| 5,295,120 | * | 3/1994 | McShane ............................. 367/188 |
| 5,883,459 | * | 3/1999 | Cline et al. .......................... 310/339 |
| 5,962,952 | * | 10/1999 | Gluszyk et al. ..................... 310/324 |
| 6,064,141 | * | 5/2000 | Wiciel ................................. 310/339 |

* cited by examiner

Primary Examiner—Thomas M. Dougherty
(74) Attorney, Agent, or Firm—Jackson Walker L.L.P.

(57) ABSTRACT

An ultrasonic transducer having a unique design that can withstand changes in temperature and pressure and will operate in corrosive environments. The transducer is used to detect the distance to an object being measured. The device includes a diaphragm from which is emitted a focused ultrasonic wave. The diaphragm and a capsule housing are machined from a single piece of metal and does not use adhesives or welded joints. The capsule housing is also filled with silicone oil and provided with a flexible annular ridge, both of which enhance its operation and improve signal transfer. A crystal centering seal extends 75%–90% the thickness of the crystal. A method for creating a negative internal pressure provides for improved ultrasonic wave propagation.

2 Claims, 5 Drawing Sheets

ULTRASONIC TRANSDUCER

This is a continuation-in-part application of U.S. Pat. application Ser. No. 08/742,706, filed Nov. 1, 1996, which claims benefit of U.S. provisional application No. 60/077, 496, filed Mar. 11, 1998.

BACKGROUND OF THE INVENTION

1. Field of the Invention

This invention relates to an improved ultrasonic range-determining device using a metal diaphragm in contact with a piezoelectric transducer.

2. Description of the Related Art

It is commonly known in the art that a piezoelectric crystal can be used as a transducer to emit a sonic or ultrasonic acoustic wave when excited by an AC voltage. Such a device may be used for determination of the distance of an object through the placement of a detector which senses when the emitted acoustic wave has reached the detector. Based on the time it takes the acoustic wave to reach the detector as well as the speed of the acoustic wave within the transmission medium, the distance from the source of the wave to the detector may be calculated. It is also known that the level of a liquid within a storage container may be determined through the use of a similar device and the concept of echo ranging. For example, U.S. Pat. No. 3,834,233 to Willis et al. discloses such a system. The system includes an ultrasonic transducer mounted at the top of a storage tank which directs an acoustic wave through the air down into a storage tank toward the surface of the liquid to be measured. Once the acoustic wave reaches the surface of the liquid, the wave's frequency is such that it will be reflected back toward the device which is equipped with a receiver to detect the reflected wave. The receiver thus detects the echo from the surface of the liquid and, based on the time for the signal to reach the surface of the liquid and return, calculates the distance from the ultrasonic transducer to the surface of the liquid.

However, such systems are not without their problems. Because such systems typically transmit the acoustic wave through a gaseous medium above the surface of the liquid to be measured, lower operating frequencies are required in order that the transmitted wave will be reflected at the liquid surface. These lower operating frequencies are less accurate in making distance measurements than higher frequencies. Such prior art systems have also been plagued by false signals received at the detector which did not originate from the device (such as outside noise) or which were not reflected from the material surface (i.e., reflected from the sides of the storage container). Prior art systems have also been plagued by the harsh conditions typically found within many industrial storage containers, particularly those storing corrosive substances. The quality of the device operation and the length of time these prior art detectors are able to maintain operation in such harsh environments result in their frequent malfunction and necessary replacement. Corrosive environments are especially hard on devices employing welded joints, epoxies or adhesives in their structures since it is at these points that corrosive effects are first manifested. Not only does the corrosive material itself decrease the operating life of such devices, but also changes in the operating environment of the device, including temperature and pressure changes, adversely affect such devices.

Finally, such prior art systems have been adversely affected by excessive dispersion of the emitted ultrasonic measurement beam such that the emitted signal is not strong enough to be reflected back to the device from a large distance (i.e. when the material in the storage container is at a low level). A weak emitted signal may also be caused by poor signal transfer within the device from the crystal to the emitting diaphragm. Another cause of poor device performance occurs when the detector radiates the transmitted signal in a number of directions, rather than in a narrow, focused beam, thereby increasing the possibility of falsely detecting reflected waves (e.g. from the storage container walls). The prior art has employed a variety of damping materials in various configurations to try and alleviate some of these problems. For example, U.S. Pat. No. 5,121,628, issued to Merkl et al. employs one such damping approach using lead pellets. For better signal transfer, the prior art has used bonding agents such as epoxies or solder, as disclosed in U.S. Pat. No. 4,000,650, issued to Snyder.

It is, therefore, an object of this invention to provide an ultrasonic transducer which detects the presence of an object or material and is resistant to malfunction or deterioration caused by changing temperature, changing pressure, corrosive environments, or a combination of these conditions.

It is another object of the present invention to provide an ultrasonic transducer which is installed within the fluid it is designed to measure.

It is still another object of the present invention to provide an ultrasonic transducer which has greater accuracy than that provided by existing devices.

It is yet another object of the present invention to provide an ultrasonic transducer with improved signal transfer, focus and strength resulting in a larger measurement range.

It is yet another object of the present invention to provide an ultrasonic transducer which is self-calibrating.

It is still another object of the present invention to provide an ultrasonic transducer having an improved, smaller size.

It is yet another object of the present invention to provide an ultrasonic transducer which can measure the material level of the contents within a storage container.

It is yet another object of the present invention to provide a reduced oil fill volume within the transducer for improved consistency of signal generation.

It is yet another object of the present invention to provide improved electrical lead connection within the transducer.

It is still another object of the present invention to provide a negative internal pressure within the transducer to improve diaphragm contact with the crystal.

It is another object of the present invention to provide an ultrasonic fluid-level detector which may be installed from the top, bottom, or side of the storage tank.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

According to the present invention, the foregoing and other objects and advantages are attained by an ultrasonic transducer that emits a focused ultrasonic wave. The wave is aimed towards the surface of the object being detected and then is reflected back toward the device. The device senses the reflected wave and measures the time it takes the wave to travel to the surface of the object and return to the detector. Based on this time measurement and the time measurement for a calibration wave to travel a fixed distance, the device calculates the distance from its location to the surface of the object. In this way, the device determines the distance to the object.

The device is generally a component of a probe which is connected to a remote display readout or other interface capable of using information from the device. The probe further comprises a probe head that contains two ultrasonic transducers, a sliding seal mechanism, and appropriate electronic components. Each ultrasonic transducer is capable of sending and receiving ultrasonic signals through a variety of media to the object being measured. One transducer is used for calibration of the speed of the ultrasonic wave within the propagation medium, and the second transducer makes possible the calculation of the distance to the object. The housing for each transducer serves dual functions in that it provides protection for the internal workings of the transducer while at the same time serving to transmit the ultrasonic wave into the propagation medium through a stiff signal-transfer disk. Just inside the housing is a piezoelectric crystal which is directly adjacent to and in contact with the signal-transfer disk. When the crystal is biased with an AC voltage oscillating at a fixed frequency, the crystal vibrates against the signal-transfer disk. This in turn causes an ultrasonic wave with a relatively straight wave front to be transmitted into the medium. Within the operating frequency range of the device, the ultrasonic wave is reflected by the surface of the object back toward the transducer. The reflected wave re-energizes the crystal, and the internal electronics of the device sense this re-energization. The device electronics calculate the time it takes the wave to travel to the surface of the object and return. Based on a similar ultrasonic wave sent by the second transducer to a calibration target located a known distance away, the distance to the surface of the object may be determined and then used in a variety of applications or just displayed on a readout. Optimum operation of the device can be attained for a number of different applications having different propagation media by varying the operating frequency of the device. When the device is installed in a storage tank for the purpose of measuring the level of the fluid stored in the tank, it may be installed from the bottom, sides, or top of the storage tank. With a change in the operating frequency, the device may also be installed just inside the top of the storage container so as to emit its beam through the air above the surface of the liquid for reflection at the liquid surface.

Still other objects and advantages of the present invention will become readily apparent to those skilled in this art from the following detailed description, wherein multiple preferred embodiments of the invention are shown and described, simply by way of illustration of the best mode contemplated by the inventor for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE PREFERRED EMBODIMENT

As generally described above, the device of the present invention has practical applications in a number of situations. The device may be used for top-down material measurement in a storage container, as a flow meter, a level switch, or a counter or positioning switch for applications involving conveyors. Throughout the rest of this application, use of the device will be confined to determining the fluid level in a storage container. However, this confinement is not to be construed as limiting use of the device in any way. Because the device may be used in conjunction with determining the level of liquid within a storage container, it can be used in a variety of industries. Some representative industries include the petroleum industry (crude oil, diesel, gasoline, asphalt), the food processing industry (cooking oil, milk, water), the chemical industry (liquid sulphur, liquid butane, liquid propane), oil well monitoring, just to name a few. The device can also withstand use in corrosive environments, pressurized conditions, changing gravity, toxic materials, and wide temperature variations. The probe containing the device is typically installed within the liquid inside the storage container near the bottom. Once the probe containing the transducer is inside the container, it is extended into its operating configuration. The probe remains electrically connected to a display readout on which its fluid measurements are shown. A single display readout may be connected to several different measurement probes, each of which monitor a different tank.

Figure 1:
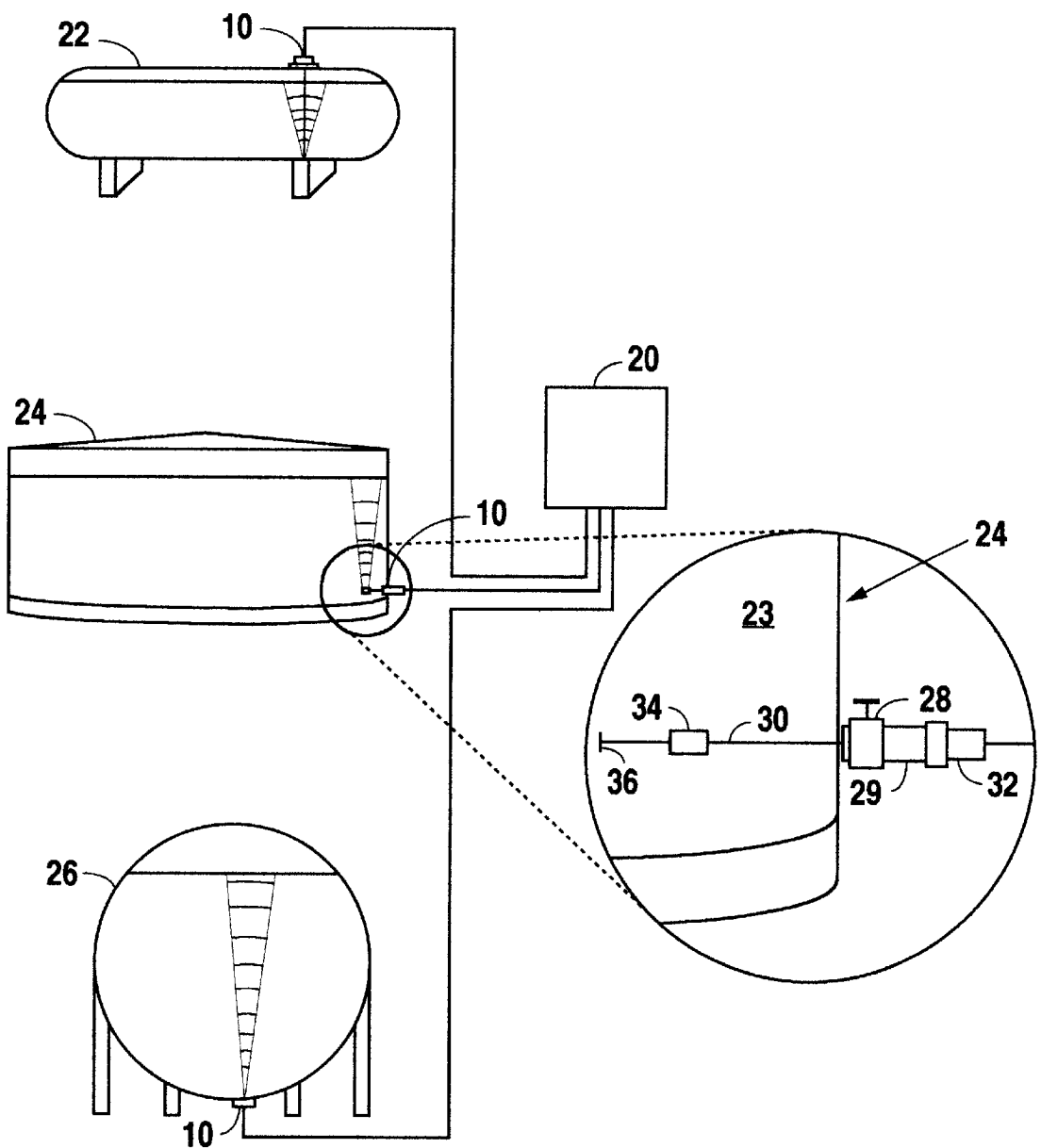
FIG. 1 is a cross-section view of various installation configurations for the device within a storage container.

Reference is made, therefore, to FIG. 1 for a description of a first embodiment of the current invention. FIG. 1 shows a perspective view of an ultrasonic fluid-level detector (10) housing the transducer of the present invention. The detector (10) includes a display readout (20) electrically connected to at least one probe (30). Information from each probe (30) regarding the fluid level (not shown) within the storage container (24) in which it is mounted is relayed to and displayed on the display readout (20). The display readout (20) remains outside the storage tank (24), while the probe (30) is mounted inside the storage tank (24) and within the fluid (23) to be measured. The probe (30) has a total length of five feet in the preferred embodiment, although the probe (30) can have any length required by a specific application.

FIG. 1 also depicts various installations of the probe (30) within a storage tank (22, 24, 26) containing a fluid (23) whose level is to be monitored by the detector (10). Storage tank (22) shows installation of the detector (10) through an opening in the top of the storage tank (22). When installing the detector (10) from the top of tank (22), the probe (30) must be extended to the vicinity of the bottom of the tank (22) in order to be able to read the fluid level over its widest possible range. Similarly, storage tank (26) shows installation of the detector (10) through an opening in the bottom of the tank (26). Because the probe (30) is already positioned close to the bottom of tank (26) in this type of installation, the probe (30) is extended at a fixed distance from the bottom into the interior of the tank (26). Finally, FIG. 1 shows installation of the detector (10) through the side of storage tank (24). Again, for maximum fluid-level range detection, the detector (10) should be installed near the bottom of the tank (24). It is expected that side-entry installation of the probe (30) will be the installation method most used due to the ready existence of access ports through which the probe (30) may be installed.

FIG. 1 provides an enlarged view of the probe (30) in its installed position in tank (24). For side-entry installation, installation of the probe (30) begins by first closing the valve (28) over the opening in the storage tank (24). Any cap (not shown) over the nipple (29) is then removed. The nipple (29) should have a nominal size of 2 inches×12 inches in order to accommodate the probe (30). The sliding seal (32) is positioned along the probe (30) next to probe head (34). The end of the probe (30) containing the calibrator target (36) is then inserted into the valve (28), and the sliding seal (32) is attached to nipple (29), usually by screwing onto threads located on the nipple (29). Once a secure attachment between the probe (30) and nipple (29) has been made, the valve (28) is opened allowing the probe head (34) and calibrator target (36) to be extended into the liquid in the storage tank (24). This extension is accomplished by applying pressure to the end of the probe (30) opposite the calibrator target (36) which is located outside the tank (24). The probe (30) glides through the sliding seal (32) and into the interior of the tank (24). Once the probe (30) is in its fully extended and level position within the storage tank (24), it is ready to begin taking fluid level measurements.

The target (36) is a disc approximately 18" in diameter and 0.1" thick. The placement of a small 0.25" diameter hole in the center of the disc has been shown to improve unit accuracy.

Figure 2:
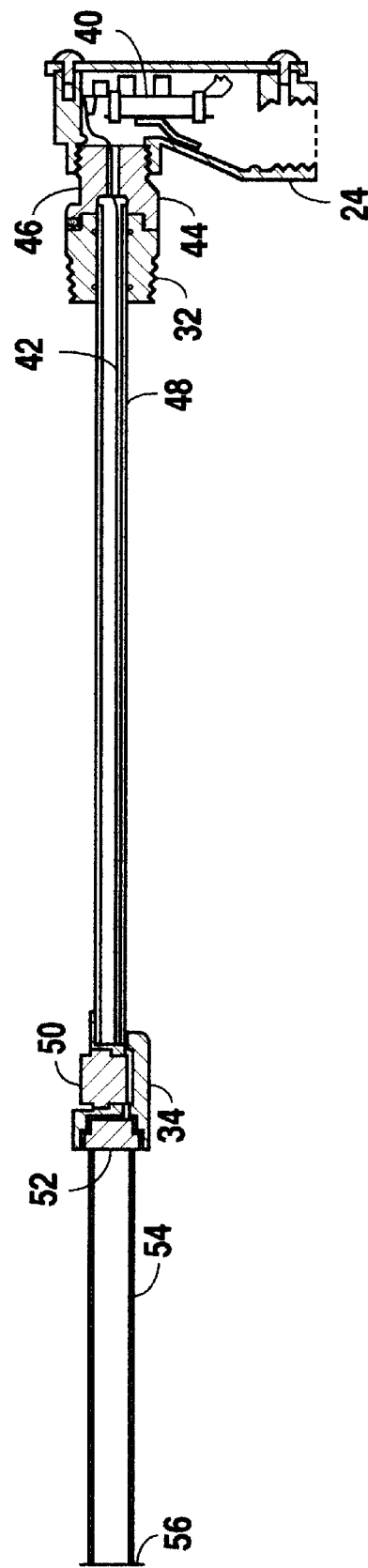
FIG. 2 is a cross-section view of a preferred embodiment of the probe shown in FIG. 1.

As more fully shown in FIG. 2, in its completely extended position, the probe (30) consists of line driver (40) which is electrically connected via wires (42) to probe head (34). The wires (42) extend through the level housing (44) containing the level (46), through the sliding seal (32) and probe body (48), terminating at probe head (34). In the preferred embodiment, a bubble level (46) is used when installing the probe (30) to ensure that the probe (30) is aligned vertically for emission of the ultrasonic wave toward the liquid surface. Levelling of the probe (30) occurs by rotating the probe within the nipple (not shown) of the storage tank until the bubble level (46) shows that the probe (30) is level. The probe (30) should be aligned less than or equal to 4° to either side of vertical in order to ensure proper operation of the detector (10).

The probe head (34) consists of two sonar transducers (50, 52). The measuring sonar transducer (50) is oriented to emit an ultrasonic wave vertically toward the surface of the liquid being measured. The calibrating sonar transducer (52) is oriented to emit a calibrating ultrasonic wave parallel to calibrator body (54) which will be reflected by calibrator target (56). Both transducers (50, 52) may be independently excited at either the same or different frequencies, but in all other respects are identical in their construction.

Figure 3:
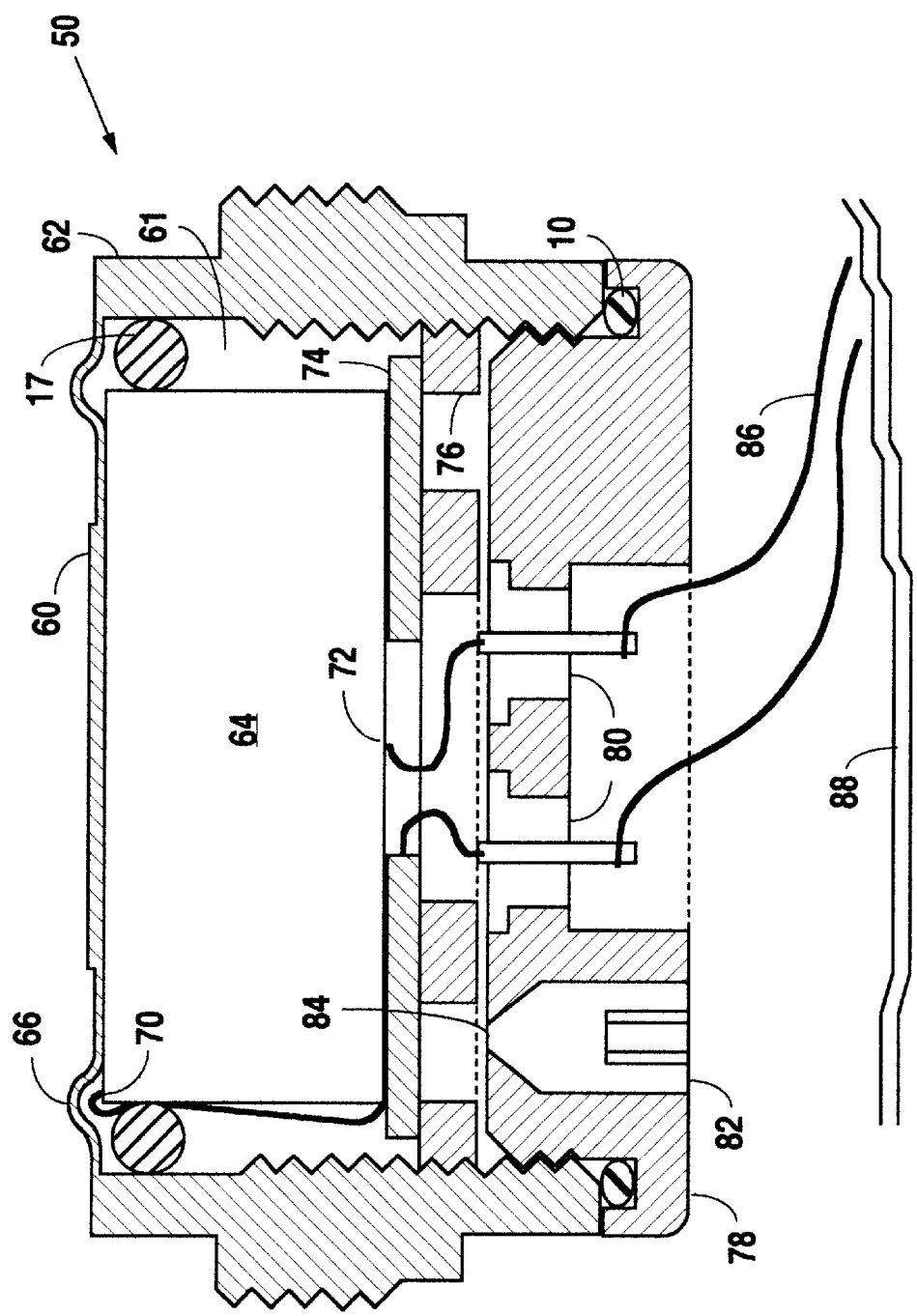
FIG. 3 is a cross-section view of a preferred embodiment of an ultrasonic transducer shown in FIG. 2.

FIG. 3 shows a cross-sectional view of the elements making up each of the sonar transducers (50, 52). Each transducer (50, 52) has a generally circular cross-section when cut through a horizontal plane parallel to the emitting surface, or diaphragm (60). Each transducer (50, 52) is housed in a capsule housing (62) that includes diaphragm (60) and defines a cavity (61) for housing components. The capsule housing (62) and diaphragm (60) are machined from a single piece of metal. The metal used in the preferred embodiment is Inconel alloy 718 which is used for its small grain aspects. The smaller the grain of the metal, the more of the emitting signal is transmitted from the crystal (64) through the diaphragm (60) and into the propagation medium. While larger grain metals may be used to make the capsule housing (62), the quality of the emitted signal will be adversely affected. The capsule housing (62) includes at its top surface an annular ridge (66) which surrounds the diaphragm (60). When machining the capsule housing (62), the thickness of the metal comprising the capsule housing (62) affects the operation of the device (10). For example, if the metal is too thin (i.e. less than $4/1000$ of an inch), the capsule housing (62) is likely to rupture with variations in operating pressure or temperature. In addition, with current technology, it is practically impossible to machine metal less than $4/1000$ of an inch. On the other hand, if the metal is too thick, the annular ridge (66) will be less effective at transmitting the vibrations from the crystal (64) through the diaphragm (60) and into the liquid. Optimally, the thickness of the metal surrounding the diaphragm (60) is $8/1000$ of an inch. In addition, the thickness of the diaphragm (60) itself has an optimal range. In the preferred embodiment, the diaphragm (60) has a thickness of $13/1000$ of an inch, although the thickness could be as low as $9/1000$ of an inch or as high as $45/1000$ of an inch. The diameter of the diaphragm (60) may be varied as the specific application requires. For the fluid measurement application, the diameter of the diaphragm (60) is 0.5 inches.

The annular ridge (66) serves the unique purpose of allowing the transducers (50, 52) to withstand changes between the external pressure of the liquid and the internal pressure within the transducer while still keeping the diaphragm (60) in a horizontal position with no bending for accurate transmission of the ultrasonic wave. The annular ridge (66) prevents the diaphragm (60) from bulging due to differences in external and internal pressure and thus maintains a flat transmission surface. This flat transmission surface insures that the emitted wave is narrow and properly focused. Finally, the annular ridge (66) allows the transducer to withstand changes in temperature by permitting the capsule housing (62) to expand and contract with increasing and decreasing operating temperatures, respectively.

Located adjacent to the diaphragm (60) and inside the capsule housing (62) is the crystal (64). In the preferred embodiment, the crystal (64) is a piezoelectric crystal that is cylindrical in shape and has a diameter somewhat smaller than the diameter of the interior of the capsule housing (62). In order to center the crystal (64) within the capsule housing (62), a crystal positioning seal (17), typically made from teflon, is placed inside the capsule housing (62).

In the preferred embodiment, the crystal (64) is electrically connected to negative wire lead (70) and positive wire lead (72). Through these two wire leads (70, 72), the crystal (64) can be biased with an AC voltage at a high frequency so that the crystal (64) is energized and begins to vibrate. Vibration of the crystal (64) against the diaphragm (60) produces an ultrasonic wave as is known in the art. To complete the elements of the sonar transducer (50, 52), an annular isolation spacer (74) is placed next to the crystal (64), and the wire leads (70, 72) protrude through the center opening in the isolation spacer (74). In the preferred embodiment, the isolation spacer (74) is made from mica due to its extremely hard characteristics. The isolation spacer (74) assists in maintaining contact between the crystal (64) and diaphragm (60). An annular nut (76) is then screwed into the interior of the capsule housing (62) along threads contained inside the capsule housing (62). Then, a diaphragm capsule nut (78) containing two connectors (80) is threaded onto the capsule housing (62). The diaphragm capsule nut (78) seals the interior of the transducer (50) and provides an electrical connection for the wire leads (70, 72) through the connectors (80). In the preferred embodiment, the connectors (80) are glass pack connectors because of their ability to withstand changes in pressure and temperature.

The diaphragm capsule nut (78) also contains a passage (82) which provides access to the interior of the capsule housing (62) once the capsule nut (78) is in place. In the preferred embodiment, a vacuum is applied to this passage (82). After the vacuum has been applied, the interior of the capsule housing (62) is flooded with oil through passage (82). Once the interior of the capsule housing(62) is full of oil, the passage (82) is sealed with a plug (84). Injecting the oil under vacuum ensures that all of the air-filled spaces within the capsule housing (62) are replaced with oil. The function of the oil is to maximize transfer of the vibrations from crystal (64) to the diaphragm (60) at the proper frequency by directing the energy from the crystal (64) to the diaphragm (60). In this way, no glue, adhesives, epoxies, or solder which often break down and lose effectiveness under high pressure and/or high temperature, are used in the detector (10). In the preferred embodiment, the oil used is a silicone oil due to its ability to withstand high pressure and high temperature and retaining its unique properties for a longer period of time than other conventional oils. Further, silicone oil is food-graded so that the detector (10) may be used in food processing applications. At the opposite ends of the connectors (80), additional wire leads (86) are attached for connection to the electronics of the detector (10). A similar set of wire leads (88) connect the electronics of the detector (10) to the calibrating sonar transducer (not shown) which, as previously mentioned, is constructed similarly to the measuring sonar transducer (50) with possible minor variations, such as crystal (64) size.

Figure 3A:
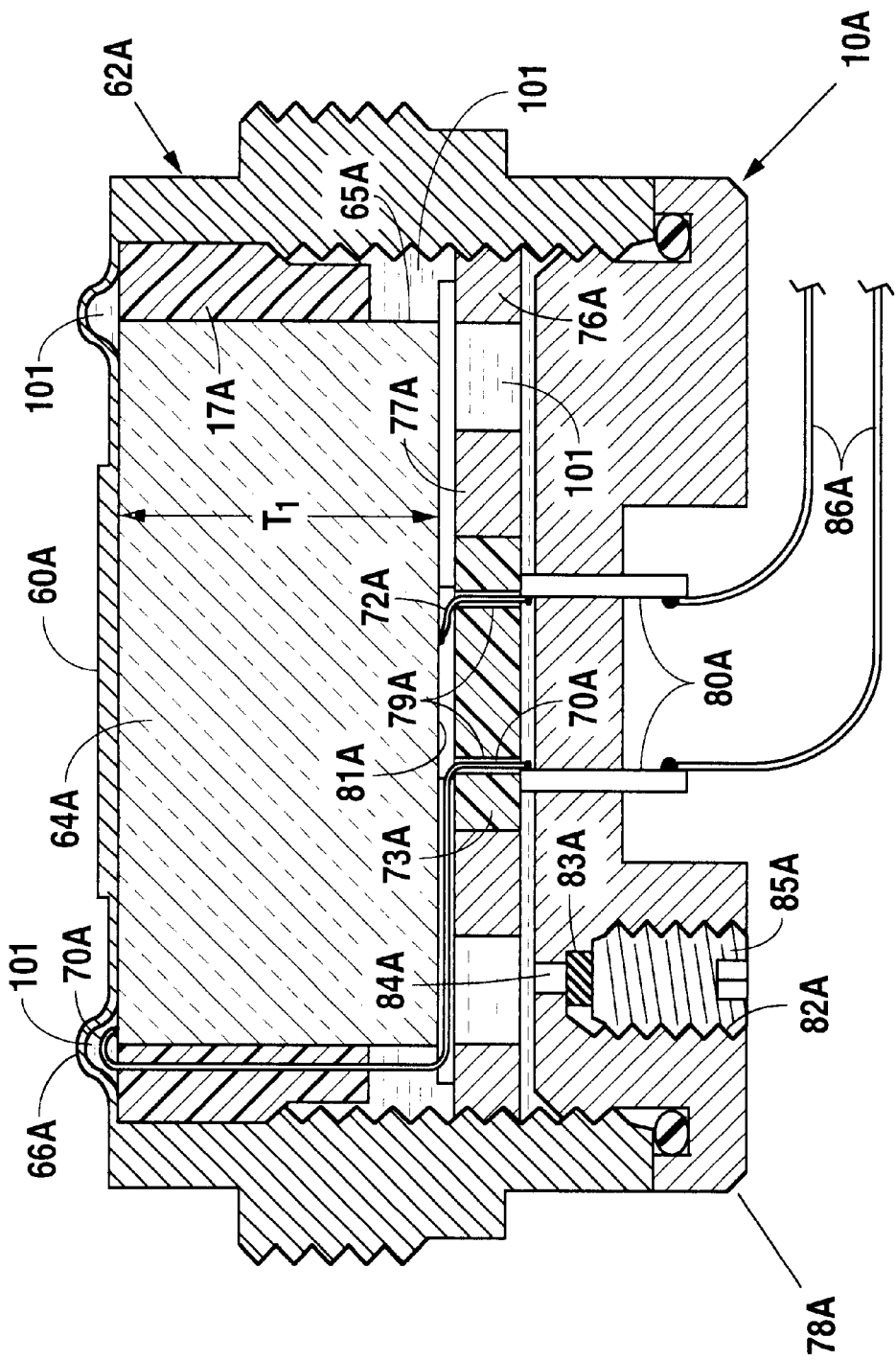
FIG. 3A is a cross-section view of an improved transducer design.

FIG. 3A illustrates an improved embodiment of the transducer 10A. The most significant changes in the transducer 10A of FIG. 3A from that of transducer 10 of FIG. 3, are the crystal positioning seal 17A, the center spacer 73A, and the capsule plug 84A.

The crystal positioning seal 17A substantially fills the gap between the outer side 65A of crystal 64A and the inner side 63A of capsule 62A. The seal 17A extends 75%–90% the entire thickness $T_1$ of the crystal 64A. By substantially filling the gap, less oil is needed to fill the spaces in the transducer. Because oil is subject to contraction and expansion as the transducer is subject to temperature changes, transducer accuracy is improved by reducing the volume of oil inside the transducer.

It has been found that the use of a tetrafluoroethylene polymer resin seal composition (TEFLON®) is preferable to standard butyl rubber seals. The composition's purity and ability to withstand high temperatures without compromising the physical structure of the seal is a decided advantage in a silicon oil environment.

A single cut or notch through one side of seal 17A facilitates the insertion of the seal 17A into the capsule 62A by allowing the seal diameter to be reduced when compressed or squeezed and also allows the negative lead wire 70A to pass to the upper side of the crystal 64A.

FIG. 3A further shows the insertion of a generally flat, circular spacer 73A positioned in the center of the backup washer 77A. Spacer 73A is provided with a center opening 79A through which electrical leads 70A and 72A pass. The positive lead 72A is connected to the base 81A of crystal 64A while the negative lead 70A extends through a channel in isolation spacer 74A and the notch in positioning seal 17A to the top of crystal 64A. Spacer 73A is maintained in position by an interference fit inside washer 77A.

It has been found that while the spacer 73A provides protection to the leads 70A and 72A insuring that electrical connection is maintained within the transducer 10A, the spacer 73A further occupies a volume of space previously filled with oil. Again, the reduction in the overall oil volume within the transducer 10A results in improved performance and consistency of operation.

An alternative method of filling or charging the transducer 10A has improved transducer performance. After a vacuum is pulled on opening 82A as discussed above with transducer 10, and oil 101 is flooded to fill all the spaces inside the transducer 10A, the transducer 10A is heated to 300°–350° F. to cause the oil inside the transducer 10A to expand. As the oil 101 expands an excess volume of oil will flow out of opening 82A. Set screw 85A is then tightened urging copper plug 84A to close opening 83A in the transducer 10A. The use of a copper capsule plug 84A further improves transducer reliability. Now all voids within the transducer have been filled with a minimum amount of oil 101 being required. The heating of the transducer is terminated. As the transducer 10A cools, the oil 101 within the transducer 10A cools and contracts creating a negative pressure inside the transducer. The flexible diaphragm 60A is drawn tightly against the crystal 64A thereby improving signal propagation.

Figure 4:
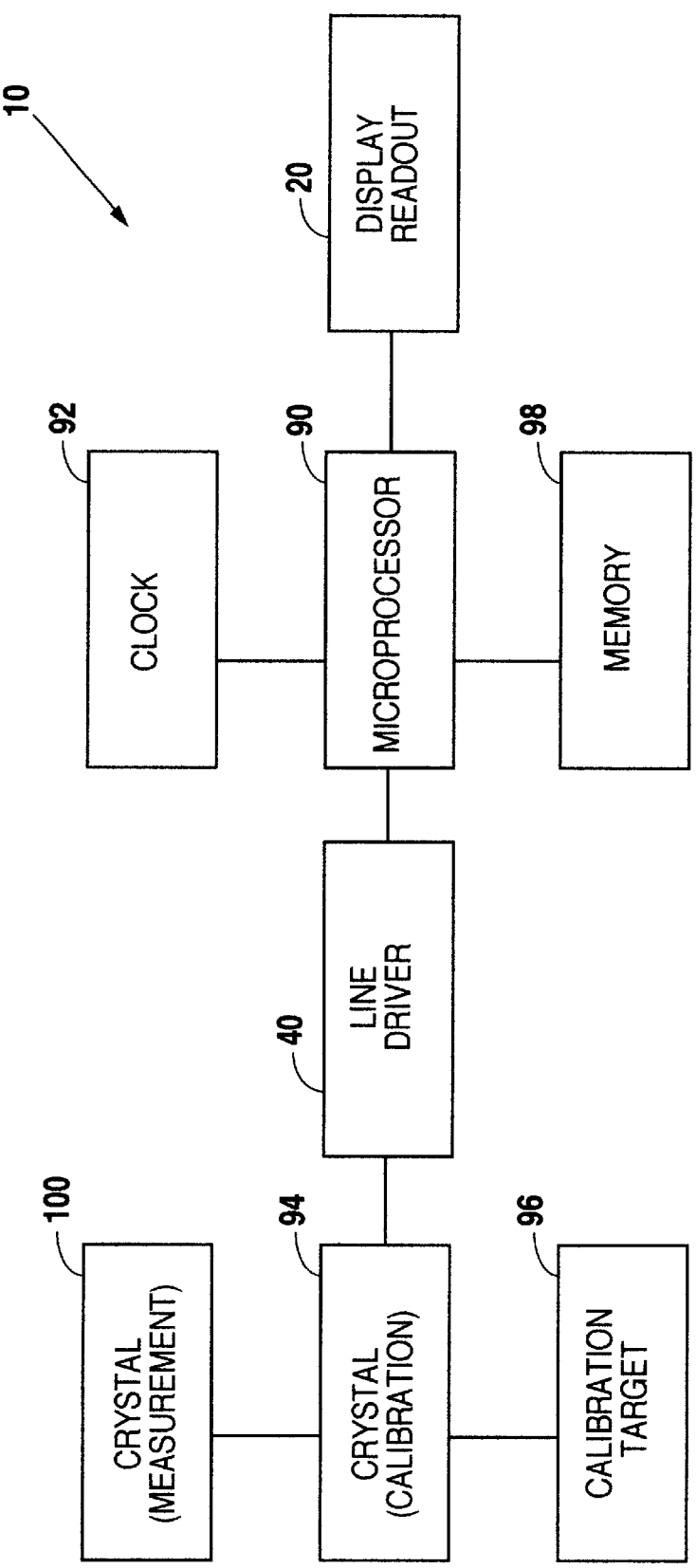
FIG. 4 is a block diagram of a preferred embodiment of an ultrasonic fluid measurement detector application of the present invention.

FIG. 4 shows a block diagram for the ultrasonic fluid level detector (10). Once the detector (10) is installed within the storage tank containing the fluid to be measured, its basic operation proceeds as follows. The microprocessor (90) senses when the detector (10) is operational. In the preferred embodiment, the microprocessor is a Motorola M68HC11. The microprocessor (90) has the ability to handle the monitoring of a number of different storage tanks in variable sequence. The microprocessor (90) is connected to a clock (92) which coordinates operation of the detector (10). The first step in taking any distance reading, including fluid level detection, is to take a calibration reading. The microprocessor thus signals the line driver (40) to momentarily energize the calibration crystal (94) so that it emits an ultrasonic wave aimed at the calibration target (96). The line driver (40) energizes the calibration crystal (94) by applying an AC voltage pulse across the crystal (94) having a predetermined duration. In the preferred embodiment, the calibration voltage pulse lasts 40 milliseconds. In the preferred embodiment, the frequency of the AC voltage is 200 kHz. The precise operating frequency of the detector (10) may be varied depending on a variety of application variables, including the range of distance to be measured and the required accuracy of the detector. As soon as the calibration crystal (94) emits the ultrasonic wave, the clock (92) begins monitoring the time it takes the ultrasonic wave to reach the calibration target (96) and return to the calibration crystal (94). The calibration target (6) is located a known distance from the crystal (94). The further away the calibration target is located, the more accurate the calibration reading. The calibration target (96) may even be an object separate from the detector such a the storage tank wall itself, provided the distance to the target (96) is known. Once the reflected ultrasonic wave reaches the calibration crystal (94), it re-energizes the crystal (94) which in turn signals to the microprocessor (90) through line driver (40) that the calibration wave has returned. The microprocessor (90) then instructs the clock (92) to stop its calibration timing measurement. The microprocessor (90) calculates the time it took the wave to return to the calibration crystal (94) and stores this information in memory (98).

Once the microprocessor (90) completes its calibration measurement, it instructs the line driver (40) to energize the measurement crystal (100) in the same fashion. Simultaneously, the microprocessor (90) polls the clock (92) for the start time of the emitted measurement wave. The measurement crystal (100) emits its ultrasonic wave toward the surface of the liquid to be measured. Once the measurement wave returns to the measurement crystal, its presence is detected, and the microprocessor (90) polls the clock (92) and calculates the travel time for the measurement wave. Because operation of the detector (10) is premised on the fact that a wave traveling within the liquid travels at a constant speed, the microprocessor (90) calculates the distance from the detector (10) to the surface of the liquid in the storage container based on the travel time of the measurement wave and the reference time and distance from the calibration process. The microprocessor (90) then adds the height of the detector (10) from the bottom of the storage tank to the distance measured from the detector (10) to the liquid surface. Based on this calculation, the microprocessor (90) indicates the level of the liquid within the storage tank on the display readout (20).

While the foregoing discussion has disclosed the ultrasonic transducer of the present invention in connection with fluid measurement in a storage tank, applications of the transducer are not so limited. The device may be used in air or other gaseous environments in addition to the liquid environment described simply by adjusting its operating frequency. It is intended that the above descriptions of preferred embodiments of the structure of the present invention and the description of its mounting locations are but three enabling best mode embodiments for implementing the invention. Other applications are likely to be conceived of by those skilled in the art, which applications still fall within the breadth and scope of the disclosure of the present invention. The primary import of the present invention lies in its ability to withstand high temperature, high pressure, and corrosive environments while retaining its accuracy. Its benefits derive from the versatility of application of the present invention and its relatively small size. Again, it is understood that other applications of the present invention will be apparent to those skilled in the art upon a reading of the preferred embodiments and a consideration of the appended claims and drawings.

We claim:

1. An ultrasonic transducer for detecting the distance to an object through a propagation medium, said transducer comprising:
   a diaphragm for emitting an ultrasonic wave through said propagation medium;
   a capsule housing, said diaphragm and said capsule housing defining a cavity, said diaphragm and said capsule housing machined from a unitary piece of metal,
   a piezoelectric crystal housed inside said cavity adjacent said diaphragm;
   a crystal positioning seal surrounding said crystal between an outer side of said crystal and an inner wall of said capsule, said seal extending along approximately 75%–90% the entire thickness of said crystal;
   a center spacer having a central orifice for passage of electrical leads to the positive and negative terminals of said crystal, said spacer disposed within a central opening of a backup washer inside said capsule.

2. Method of assembly of an ultrasonic transducer for detecting the distance to an object through a propagation medium comprising the steps of:
   a. inserting a crystal positioning seal into a capsule housing, said seal adapted to surround a piezoelectric crystal between an outer side of said crystal and an inner wall of said capsule housing;
   b. inserting said piezoelectric crystal inside a cavity defined within a diaphragm and said capsule housing, said diaphragm for emitting an ultrasonic wave through said propagation medium, said capsule housing and diaphragm machined from a unitary piece of metal;
   c. extending said crystal positioning seal along approximately 75%–90% an entire thickness of said crystal;
   d. inserting a center spacer having a central orifice for passage of electric leads to the positive and negative terminals of said crystal, said spacer disposed within a central opening of a backup washer inside said capsule;
   e. evacuating said capsule;
   f. filling said capsule with oil;
   g. heating said capsule to expand said oil; and
   h. sealing said capsule while said oil is expended.

* * * * *